United States Patent Office 3,435,678
Patented Apr. 1, 1969

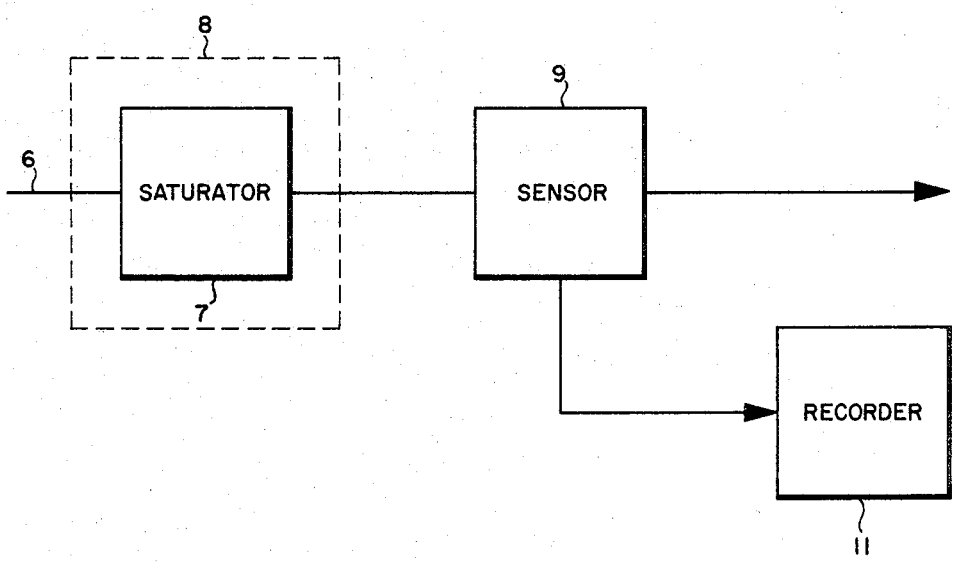

3,435,678
APPARATUS FOR FLOW MONITORING
James C. Sternberg, Fullerton, Calif., assignor to Beckman Instruments, Inc., a corporation of California
Filed June 20, 1966, Ser. No. 558,787
Int. Cl. G01f 1/04
U.S. Cl. 73—194         5 Claims

ABSTRACT OF THE DISCLOSURE

A flow rate indicator including saturating means for adding a tracer to a stream at fixed concentration and sensing means downstream to indicate the rate of introduction of the tracer. The saturator may be an iodine saturator and the sensor a galvanic cell, or a hydrogen flame detector.

---

This invention relates generally to methods of measuring the rate of flow of a fluid stream and more particularly to a new method of flow monitoring providing a generalized approach to continuous flow monitoring in a fluid stream.

In the past many methods have been utilized to measure flow in fluid streams, none of which have been entirely satisfactory. One particular method of the prior art has been to introduce into the stream an inert tracer substance at a fixed flow rate and monitor the concentration of the tracer at a point downstream. If the fluid flow decreases the concentration of the tracer in the stream at the downstream point increases giving a change in signal level at the sensor. If the flow rate of the stream increases the concentration of the tracer decreases giving a signal change in the opposite direction. One major disadvantage of such a system is that concentration sensors lead to a response which is non-linear with respect to flow changes, especially when the flow change becomes a significant fraction of the initial flow.

The present invention provides a system which is linear in response and which has a calibration independent of the nature the fluid undergoing measurement, since the flow monitoring method depends only upon the properties and flow of the tracer substance.

The attendant advantages of this invention will become better understood by those skilled in the art to which this invention pertains by reference to the following detailed description when considered in connection with the accompanying drawing and in which:

The single figure illustrates a fluid stream embodying the continuous flow monitoring method according to the instant invention.

Referring now to the drawing there is illustrated a conduit 6 which may form any suitable portion of a fluid stream, the flow rate of which is to be monitored. The fluid stream may consist of either a gas or a liquid. There is provided in the stream any suitable device 7, such as a saturator, for introducing a tracer substance at fixed thermodynamic activity, thus a fixed concentration. The saturator is held at a closely regulated temperature by any suitable means 8, such as a constant-temperature bath. Conduit 6 is then connected to pass the fluid through any suitable sensing device 9. The output of the sensor is connected to any suitable indicating or recording device 11 for presentation of the output of sensor 9 in any suitable form. Generally, the indicating device 11 will be a recorder to provide a permanent indication of the output of sensor 9 as a function of time.

The temperature at which the saturator is held by the constant-temperature bath, thus determining the thermodynamic activity of the tracer, together with the area of tracer exposed to the fluid stream and the fluid stream flow rate will determine whether or not the tracer reaches equilibrium concentration. For proper functioning over the entire range of flow it is desirable that the tracer always reach equilibrium concentration. Thus, the saturator must be constructed so that the extent thereof is sufficient to insure equilibrium concentration of the tracer at the highest expected fluid flow rate. The saturator temperature should be maintained sufficiently low that the tracer activity is below that which would correspond to equilibrium with the connecting tubing between the saturator and the detector, so that the tracer activity is actually determined by the temperature in the saturator.

Sensor 9 may conveniently be selected from the type of detectors sensitive to the tracer substance which develop an output proportional to the rate of introduction of the tracer to the sensor. If the tracer reaches equilibrium concentration regardless of fluid flow, i.e., fixed concentration, the rate at which the tracer enters the sensor will be a function of fluid stream flow rate only. If the sensor is "rate of introduction" sensitive and gives an absolutely known response, the output is an indication of the flow rate of the fluid in conduit 6 and this flow measurement is absolute. If the sensor 9 responds only to the tracer and not to any other component of the fluid stream, the flow measurement becomes completely independent of what fluids are employed and measured.

Several rate of introduction sensors are well known in the art such as the hydrogen flame ionization detector or the Hersch galvanic cell utilized with an iodine saturator. A suitable example of the hydrogen flame ionization detector is described in chapter 18 of Gas Chromatography, Academic Press, New York, 1962, and in the copending application of W. Gallaway and A. Seibel, Ser. No. 347,749 for Flame Ionization Detector, now U.S. Patent No. 3,372,000, assigned to the asignee of the instant application. A suitable example of the Hersch galvanic cell is illustrated in FIG. 2 of U.S. Patent No. 3,258,411. For use in the instant invention the conversion unit 58 of FIG. 2 of said patent would be replaced by an iodine saturator. Other rate of introduction sensors sensitive to a particular tracer may be utilized, coulometric devices being particularly suitable. The only criteria of the tracer and the detector are that the sensor should respond only to the tracer and that the tracer should not react with the fluid stream in any manner adverse to any reaction being carried on downstream, or should not react such as to affect the ability of the sensor to detect the tracer.

Rate sensing detectors such as the Hersch galvanic cell and the hydrogen flame ionization detector measure the instantaneous rate of introduction or flow rate of the sample into the detector. This may be represented by the generalized equation:

$$R = K(F_t)_d \tag{1}$$

where R is the detector output, $F_t$ denotes the volume flow rate of tracer and the subscript $d$ indicates the volume flow rate of the tracer introduced at the detector.

If the tracer substance is introduced from a saturator, it will be furnished at a fixed activity, $a_t°$, which is a function of temperature only for a given tracer substance. For purposes of illustration, a gaseous fluid stream will be considered. For an ideal gas, the activity can be represented by the vapor pressure, $P_t°$. Therefore, if the temperature is constant:

$$(F_{t_d}) = FX_t = F\frac{P_t°}{P} \tag{2}$$

where F is the total flow rate, P the total pressure, and $X_t$ is the mole fraction of tracer and is a constant, provided that the total pressure is constant, i.e., independent of flow rate. This condition is normally met by having the detector discharge to atmosphere. The total flow is then given by the equation:

$$F = F_c + F_t = F_c + FX_t \quad (3)$$

where $F_c$ is the volume flow rate of the fluid. Thus:

$$F = \frac{F_c}{1 - X_t} \quad (4)$$

The response R of the sensor is then given by $$R = KF_t = KF\frac{P_t^\circ}{P} = KF_c\frac{X_t}{1-X_t} = KF_c\frac{P_t^\circ}{P-P_t^\circ} \quad (5)$$

From Equation 5 it may be seen that the response is linear in $F_c$, the flow rate of the fluid stream.

If the vapor pressure is very small, $P_t^\circ \ll P$, the response in flow sensing is lower by the factor $P_t^\circ/P$ than the inherent response of the device to a flow of the pure tracer. Thus, if a vapor pressure of 1 mm. is used at atmospheric pressure, the response is about 0.1% of the normal response of the detector to the tracer substance. From the foregoing it is apparent that the rate of introduction sensor with a saturator provides a most desirable system since its response is linear. However, the saturator must be closely temperature controlled since typically 0.02° C. temperature variations can cause as much as 0.1% change in the partial pressure and hence in the background signal level from the saturator.

When utilizing a Hersch galvanic cell as the sensor with an iodine saturator the current level is related to the flow rate by $$i = \frac{2F}{60RT}\frac{P_t^\circ}{P-P^\circ}96{,}500 \text{ amps} \quad (6)$$

where F is the flow rate in cc./min., R is the gas constant in cc.-atm./mole degree, and T the absolute temperature. This relationship will be independent of the fluid measured. It is essential that the foregoing system be utilized with a flow controller rather than a pressure regulator. If the flow into the system is constant, the effect of a source or sink is directly measured since $$(F_c)_d = F_c^\circ - F_s \quad (7)$$

It is apparent that the detector illustrated may be utilized at any point of the stream but that it is particularly adapted for utilization at a point where the stream is to be vented. By appropriate selection of the tracer and the sensor, the detection system can be made completely independent of the gas or gases involved and the reactions taking place upstream from the detector. Any organic vapor to which the hydrogen flame ionization detector is responsive may form the tracer substance introduced by the saturator when the hydrogen flame ionization detector is used as the sensor. It is further apparent that the detector constructed after the teachings of this invention has a response which varies linearly as a function of flow rate.

Obviously, many other modifications and variations of the present invention are possible and will be obvious to those skilled in the art in light of the foregoing teachings without departing from the spirit and scope of the appended claims.

What is claimed is:

1. A flow rate indicator for indicating the rate of flow of a fluid stream comprising:
   saturating means connected in said fluid stream for adding a tracer to said stream at a fixed concentration;
   sensing means connected in said fluid stream at a point downstream from said saturating means, said sensing means being unaffected by other components of said fluid stream and being sensitive to the rate of introduction of said tracer to said sensor thereby indicating the rate of flow of said stream.

2. A flow rate indicating means for indicating the rate of flow of a fluid stream comprising:
   saturating means connected in said fluid stream for introducing a tracer substance thereto;
   means controlling the temperature of said saturating means such that the tracer substance is introduced at fixed thermodynamic activity; said temperature and the extent of said saturator being such that said tracer substance reaches equilibrium concentration in said stream;
   sensor means positioned downstream of said saturator, said sensing means being unaffected by other components of said fluid stream and providing an output indicative of the rate of introduction of said tracer substance into said sensor.

3. The flow rate indicator of claim 2 wherein said sensor responds only to said tracer substance.

4. The flow rate indicator of claim 2 wherein said saturator comprises an iodine saturator and said sensor a galvanic cell sensitized to iodine.

5. The flow rate indicator of claim 2 wherein said tracer substance is an organic vapor and said sensor means is a hydrogen flame ionization detector.

References Cited

UNITED STATES PATENTS

| | | | |
|---|---|---|---|
| 2,589,219 | 3/1952 | Bond et al. | 73—155 X |
| 2,631,242 | 3/1953 | Metcalf. | |
| 3,117,225 | 1/1964 | Willis | 250—43 |

RICHARD C. QUEISSER, *Primary Examiner.*

EDWARD D. GILHOOLY, *Assistant Examiner.*